United States Patent [19]

Pelletier et al.

[11] Patent Number: 4,650,017

[45] Date of Patent: Mar. 17, 1987

[54] CRAWLER-MOUNTED MACHINE FOR TRAVEL OVER NATURAL TERRAIN

[75] Inventors: Jean Pelletier, St-Félicien; Jacques Tanguay; Clément Potvin, both of St-Prime, all of Canada

[73] Assignee: Industries Tanguay, Inc., Canada

[21] Appl. No.: 702,335

[22] Filed: Feb. 15, 1985

[51] Int. Cl.$^4$ .................. B60G 17/04; B62D 55/00
[52] U.S. Cl. .................. 180/9.1; 37/DIG. 20; 180/9.52; 180/41; 280/6 H
[58] Field of Search .................. 180/9.1, 9.23, 9.5, 180/9.46, 9.6, 9.54, 9.07, 41, 14.1, 24, 89.14, 89.15, 89.16, 6.6, 6.56, 9.52; 280/6 R, 6 H, 6.1, 111, 104, 764.1; 212/189; 414/699; 144/3 D, 208 E, 22; 37/103, 108 R, DIG. 20

[56] References Cited

U.S. PATENT DOCUMENTS

| | | | |
|---|---|---|---|
| 2,572,910 | 10/1951 | Brown | 280/6.1 |
| 2,828,137 | 3/1958 | Wagner | 180/9.5 |
| 3,088,531 | 5/1963 | Garrett et al. | 180/9.5 X |
| 3,688,821 | 9/1972 | McColl | 144/3 D |
| 3,712,404 | 1/1973 | Walquist | 180/212 |
| 3,772,804 | 11/1973 | Bomeke | 37/103 |
| 3,881,533 | 5/1975 | Savage et al. | 144/3 D |
| 4,288,196 | 9/1981 | Sutton, II | 280/6.1 X |
| 4,324,304 | 4/1982 | Hashimoto et al. | 180/41 X |
| 4,326,571 | 4/1982 | Crawford | 280/6 H X |
| 4,350,190 | 9/1982 | McColl | 144/3 D |

FOREIGN PATENT DOCUMENTS

| | | |
|---|---|---|
| 586598 | 11/1959 | Canada . |
| 779163 | 2/1968 | Canada . |
| 817289 | 7/1969 | Canada . |
| 1047548 | 1/1979 | Canada . |
| 1113532 | 12/1981 | Canada . |
| 1147760 | 6/1983 | Canada . |
| 2534726 | 2/1977 | Fed. Rep. of Germany ....... 180/9.5 |
| 1048722 | 11/1966 | United Kingdom ................ 212/189 |

Primary Examiner—Richard A. Bertsch
Assistant Examiner—Mitchell J. Hill
Attorney, Agent, or Firm—Steele, Gould & Fried

[57] ABSTRACT

A self-propelled, four-way tilt off-road vehicle for use over a natural terrain. The vehicle has a mobile carrier of any conventional structure and a work base mounted over the carrier. A tilt mechanism joins the work base to the carrier for relative tilting movement of the work base with respect to the carrier about a pair of orthogonal axes to hold the work base level.

12 Claims, 7 Drawing Figures

CRAWLER-MOUNTED MACHINE FOR TRAVEL OVER NATURAL TERRAIN

The present invention relates to a self-propelled, four-way tilt off-road vehicle that can be adapted and used, particularly although not exclusively, for felling and handling felled trees, as is known in the forest exploitation industry. The vehicle according to the invention can also be adapted for driving wood piles into the ground or for other similar purposes.

In the context of the invention, it is to be remembered that such trees or piles are essentially vertical while the surrounding ground is sloping.

The vehicle according to the invention is provided with a mobile carrier having ground-engaging traction means that can be of the wheel or crawler type and which make the vehicle adapted for travel over natural terrain. Over this carrier is provided a work base on which is mounted the required work apparatus necessary for felling and handling trees, or for driving piles, or for other similar purposes. The work base may, and preferably does, include an operator's cab as well as other pieces of auxiliary equipment, although it is only the work apparatus that need be mounted on the work base, as will readily become apparent hereinafter.

A main object and advantage of the invention results from the mounting of the work base on the mobile carrier in a way that allows easily keeping the work base level, that is horizontal, in spite of even a pronounced inclination of the carrier, to thus avoid undue stresses from developing in the work apparatus. This is obtained by providing the vehicle with a levelling system giving it a four-way tilt possibility. By "four-way tilt" is meant the possibility of tilting the work base, with respect to the carrier, back and forth in each of two directions at right angles to one another, that is along a pair of orthogonal axes, to hold the work base level.

Another important object and advantage of the off-road vehicle of the invention is that its tilting or levelling system allows a weight transfer that ensures an essentially even load distribution on the ground-engaging traction means along the full length and across such traction means. This weight transfer increases the life expectation of the mobile carrier.

Referring particularly to a tree-felling mechanism provided at the end of a boom, in the case of a tree-felling and handling machine, the invention makes it possible to avoid twisting stresses from developping in the tree-felling mechanism, often resulting in bolt breakage in the mechanism, when proper levelling of the work base is not possible. Similarly, lack of proper and adequate levelling often results in damage of the boom under such twisting stresses.

A further object and advantage of the vehicle according to the invention lies in that it advantageously keeps the center of gravity of the work base, and relevant equipment, closer to the center line of the carrier for better weight distribution.

The above objects and advantages are made possible according to the invention by joining the work base and the mobile carrier of the vehicle together by means of a tilting mechanism of the universal joint type allowing relative tilting movement of the work base and carrier about a pair of orthogonal axes so as to hold the work base level.

More specifically, and as broadly claimed herein, the invention is a self-propelled, off-road vehicle for use and travel over natural terrain, which vehicle comprises:

a mobile carrier including a pair of laterally spaced ground-engaging traction means and a central body to which said traction means are connected for displacement of the carrier over the natural terrain;

a work base mounted over said mobile carrier; and a tilt mechanism joining said work base to the mobile carrier for relative tilting movement between said base and said carrier about a pair of orthogonal axes to hold said work base level.

In this particular structure, the tilt mechanism comprises:

a crown mounted beneath the base for rotation of said base relative to and about an axis normal to said crown;

a tilt member beneath said crown;

means joining the tilt member respectively to the crown and to the central body of the carrier for tilting motion of this crown and of this base, as a unit, about said pair of orthogonal axes; and power means interconnecting the crown and the central body so as to tilt this crown and this base as a unit about said pair of orthogonal axes.

As mentioned above, the work apparatus is intended to be mounted on the work base which may also carry the operator's cab, the engine, the fuel and hydraulic tanks, all of which are then tilted in unison with the work base.

A search made prior to the filing of the present application has revealed the following patents which, as a whole, fail to disclose a construction as above broadly described. These patents are as follows:

Canadian Pat. Nos.: 586,598 of 1959; 779,163 of 1968; 817,289 of 1969; 1,047,548 of 1979; 1,113,532 of 1981; 1,147,760 of 1983.

U.S. Pat. Nos.: 2,572,910 of 1951; 2,828,137 of 1958; 3,088,531 of 1963; 3,688,821 of 1972; 3,712,404 of 1973; 3,772,804 of 1973; 3,881,533 of 1975; 4,288,196 of 1981; 4,350,190 of 1982.

A study of the above references shows that the only two patents that are pertinent to the present invention, although not disclosing the structure as claimed herein, are U.S. Pat. No 2,828,137 to Wagner and U.S. Pat. No. 4,350,190 to McColl.

The Wagner patent discloses a rock drill track-mounted machine wherein a drilling mast, having a drilling head at the lower end, must be held vertical whatever be the unevenness of the ground over which the machine stands. To achieve this, a levelling system is used which involves two horizontal pins, one longitudinal and one transverse with respect to the lateral tracks. These pins are structurally interconnected and the system constructed so as to allow each track to move, only in its own vertical plane, independently of the other. There is no provision, in the levelling system of Wagner, for a four-way tilt such as in the vehicle of the presently claimed invention.

In the McColl patent, there is described a tree-felling and handling machine which has an elongated frame supported by two quad-wheel assemblies. The operator's cab and the severing mechanism are mounted at one extremity of the longitudinal frame while the power unit is provided at the other extremity. Each wheel of the quad assemblies is mounted for movement about both an axis parallel to the frame and an axis transverse to it so that the operator's cab may be levelled regardless of the inclination of the terrain which the wheels engage. As such, the whole levelling structure is of entirely different structural conception from that claimed herein.

The invention and its advantages will now be better understood upon reading of the following, non-restrictive description of a preferred embodiment thereof, reference being made to the appended drawings wherein.

The mobile carrier of the vehicle or machine described hereinafter is of the endless-track type but it will readily be understood to the man of the art that the ground-engaging traction means could be a quad wheel assembly rather than the shown double endless track construction, or another type of traction means.

Figure 1:
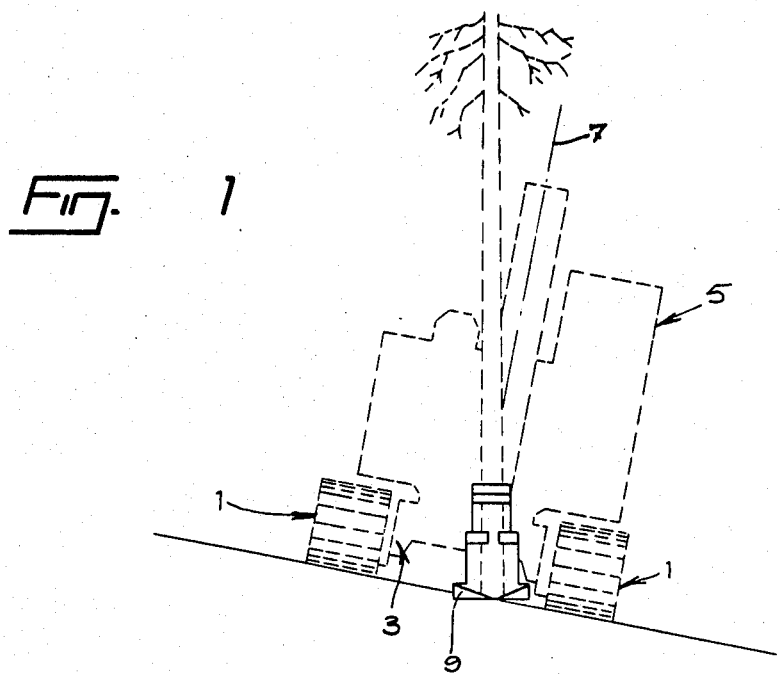
FIG. 1 is a front elevation view of a crawler-mounted, tree-felling and handling machine of conventional type with no provision for tilting the work base with respect to the crawling structure.
Figure 2:
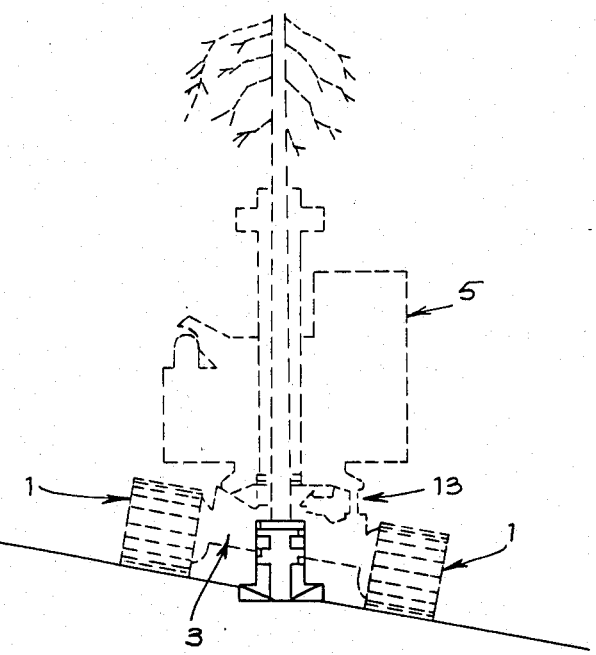
FIG. 2 is a front elevation view of a crawler-mounted tree-felling and handling machine of the endless track type, made according to the invention.
Figure 3:
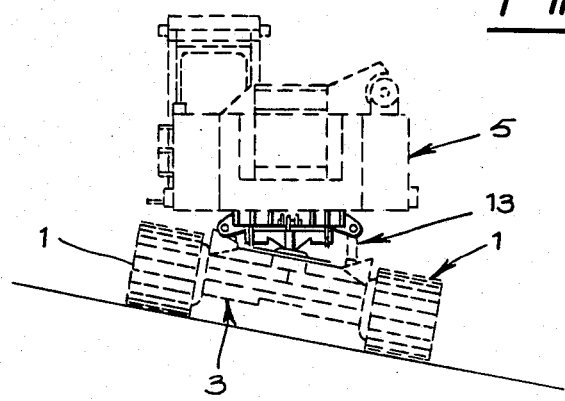
FIG. 3 is a front elevation view similar to that of FIG. 2 but with the work base rotated by 90° with respect to the crawling structure.

Referring to FIGS. 1 and 2, it will be seen that the machine has a mobile carrier including a pair of laterally spaced ground-engaging traction means in the form of endless track assemblies 1 and a central body 3 to which the track assemblies are connected for displacement of the carrier over natural terrain. A work base 5, shown here as including an operator's cab, stands over the central body 3 and is mounted over it for rotation about an axis 7 which, in the case of the conventional machine of FIG. 1, is perpendicular to the central body 3 but which, in the case of the improved machine of the invention, is made to be perpendicular to a rotation crown 15 (FIG. 6), beneath the work unit 5, as will further be described hereinafter.

Figure 4:
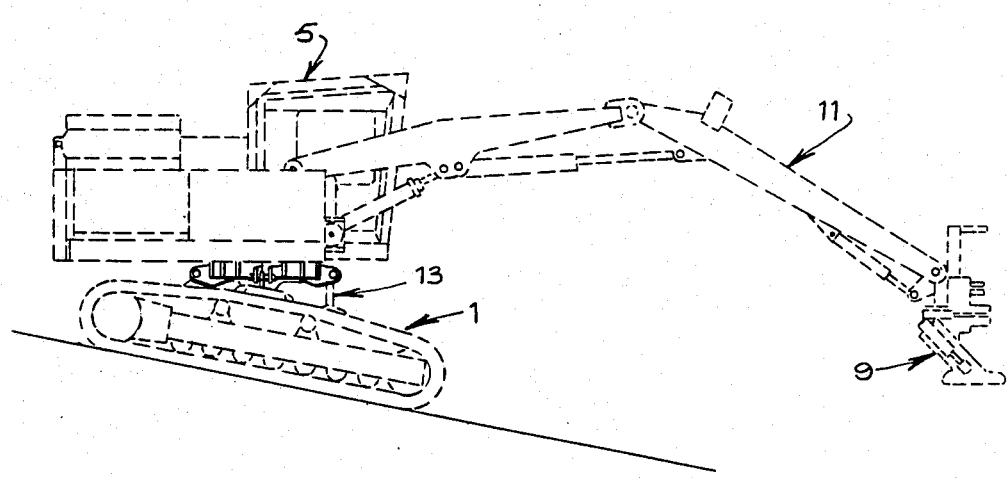
FIG. 4 is a side elevation view of the machine shown in FIGS. 2 and 3.

With reference to the conventional machine of FIG. 1, as compared particularly to the improved machine of FIG. 2, it will be readily appreciated that the tree severing and handling head 9 at the free end of the boom 11 (see FIG. 4), mounted on the work base 5, is subjected to strong twisting stresses, these stresses likewise applying to the boom 11 and this is true in spite of the fact that in some machines, the severing head 9 may be connected to the boom 11 through a pivot assembly. By the use of a tilt mechanism 13, fully described hereinafter, it is possible to give the work base 5, which includes the boom 11 and the severing head 9, a four-way tilt which will keep the work base level whereby to avoid the stresses mentioned above. This situation is clearly apparent from FIG. 2.

Figure 5:
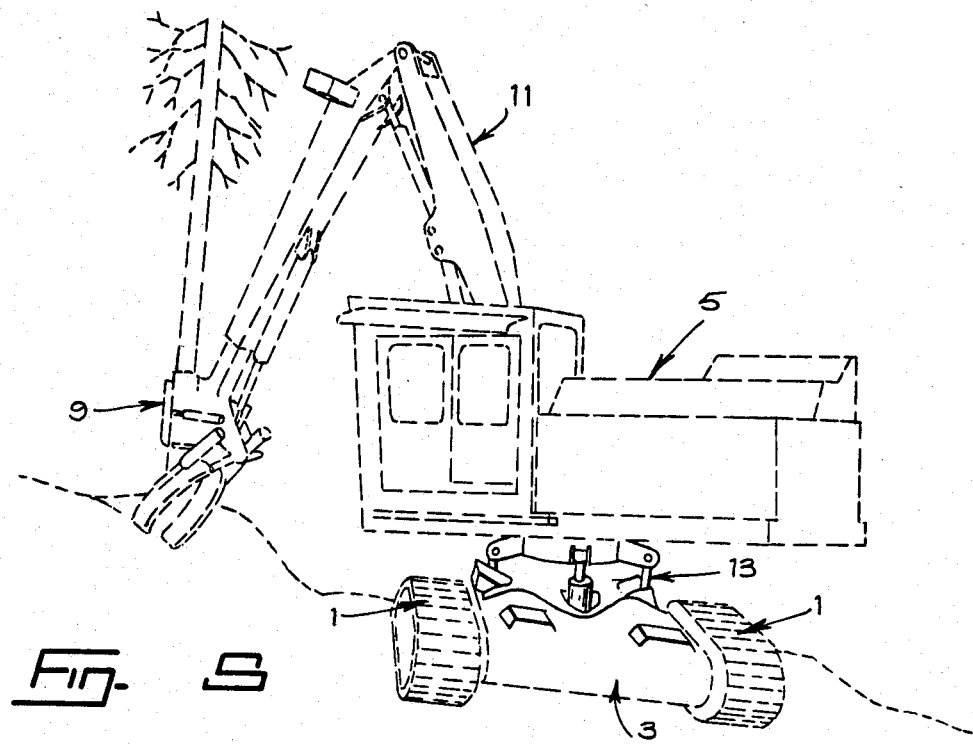
FIG. 5 is a perspective view of a machine according to the invention with the work base in rotated position with respect to the longitudinal axis of the crawling structure.

Because of its four-way tilt, the machine of the invention offers the possibility of tilting the work base with respect to the mobile carrier back and forth in each of two directions at right angles to one another and this is likewise apparent from FIG. 5.

Figure 6:
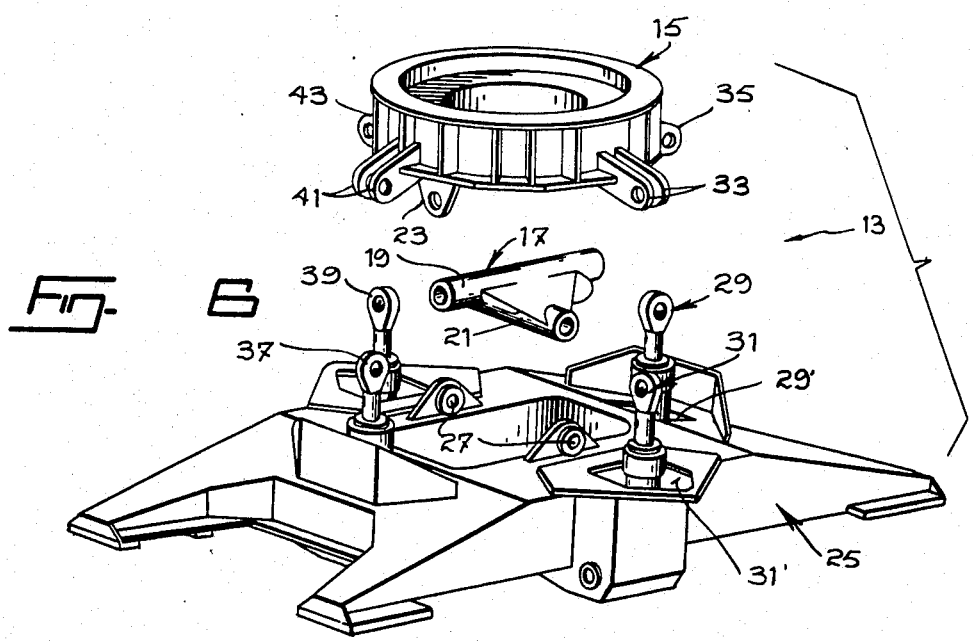
FIG. 6 is an exploded perspective view of a tilting mechanism according to the invention.

A first embodiment of the tilting mechanism 13 which makes the four-way tilt of the machine possible, is illustrated in detail in FIG. 6 to which reference is now made.

This mechanism first comprises a crown 15 mounted, in any known manner, beneath the work base 5 for rotation of the work base relative to and about an axis which is normal to the crown 15. In other words, the work base 5 is allowed rotation by any known means about an axis which is vertical when the work base is level.

Mounted beneath the crown 15 is a tilt member 17 in the form of a cruciform solid part having a longitudinal arm 19 and a cross arm 21. The longitudinal arm 19 is mounted at the ends thereof on a pair of ears 23 for pivotal movement about an axis lying in a vertical central plane of the central body 3, the mounting being by any known conventional means.

The crown 15 and tilt member 17 are bodily connected to a pedestal 25 which is fixedly secured to the central body 3 so as to become solid therewith. The connection of the tilt member 17 to the pedestal 25 is through the cross arm 21 which is pivotally mounted, in any known manner, to a pair of ears 27 upstanding from the top face of the pedestal 25. The pivot or tilt axis of the cross arm 21 lies in a plane normal to the pedestal 25 and located generally midway between the ends of the central body 3.

By the aforementioned connection of the work base 5 to the pedestal 25 through the crown 15 and the tilt member 17, it will be appreciated that there is given to the base 5 a possibility of tilting in two planes normal to one another and upstanding from the pedestal 25, hereinabove called the four-way tilt.

Power means are provided to allow tilting of the tilt member 17 and the crown 15 connected to it which, in turn, cause similar tilting of the base 5 and appertaining equipment. These power means comprises a pair of upwardly extending hydraulic jacks 29 and 31 having piston rods of which the free ends are pivotally connected to pairs of ears 33 and 35 radially projecting from the crown 15. The other ends (not visible) of the hydraulic jacks 29 and 31 are likewise mounted for pivotal movement on the pedestal 25 and at the bottom of wells 29' and 31'. Jacks 29 and 31 may be located at 90° to one another around the crown 15 as shown in FIG. 6. These jacks may however be located at another angle, especially when it is desired to allow greater slope adjustment in the longitudinal direction.

Across from the hydraulic jacks 29 and 31 are provided another pair of hydraulic jacks 37 and 39 which are likewise pivotally connected, at their lower ends (not shown) to the pedestal 25 while their upward free ends are pivotally connected to two sets of double ears 41 and 43.

When the machine stands on a flat horizontal ground and the work base 5 is levelled, the following tilting conditions prevail.

The longitudinal axes of the jack 31 and its opposite counterpart 39 both lie in a first vertical plane which can, for example, be located midway between the ends of the carrier 1, 3. The pivot axes at the ends of the jacks 31, 39 are perpendicular to that first plane.

Likewise, the longitudinal axes of the jack 29 and its opposite counterpart 37, both lie in another vertical plane which is perpendicular to the first one and may, for example, also contain the longitudinal axis of the mobile carrier. The pivot axes of the ends of the jacks 39 and 37 are also perpendicular to that other vertical plane.

All the top pivot axes of the jacks 29, 31, 37 and 39 lie in the same horizontal plane. With respect to the crown 15, the jacks 29, 31, 37 and 39 are located 90° apart.

From the above description, it follows that actuation of jacks 29 and 37 in pair, one of these jacks being lifted while the other is lowered and vice-versa, will lift or lower the work base 5 with respect to the last mentioned horizontal plane. This then offers a two-way tilt. Similarly, jacks 31 and 39 may be actuated in pair to produce the same effect thereby providing a further two-way tilt. Thus, this construction provides the four-way tilt possibility mentioned above.

In the cases where the work base and the work apparatus mounted therein is not too heavy and less power is required jacks 37 and 39 or, alternatively, jacks 29 and 31, may be removed and replaced by a pair of guiding pins (not shown). In this case, the four-way tilt is obtained by operating the two remaining jacks individually or simultaneously.

In practice, a four-way tilt construction of the type described hereinabove having its orthogonal axes aligned with the longitudinal and transverse axes of the carrier, has allowed a 10° slope adjustment, that is 17.6%, without difficulties, and operation has also been possible on somewhat steeper slopes.

Figure 7:
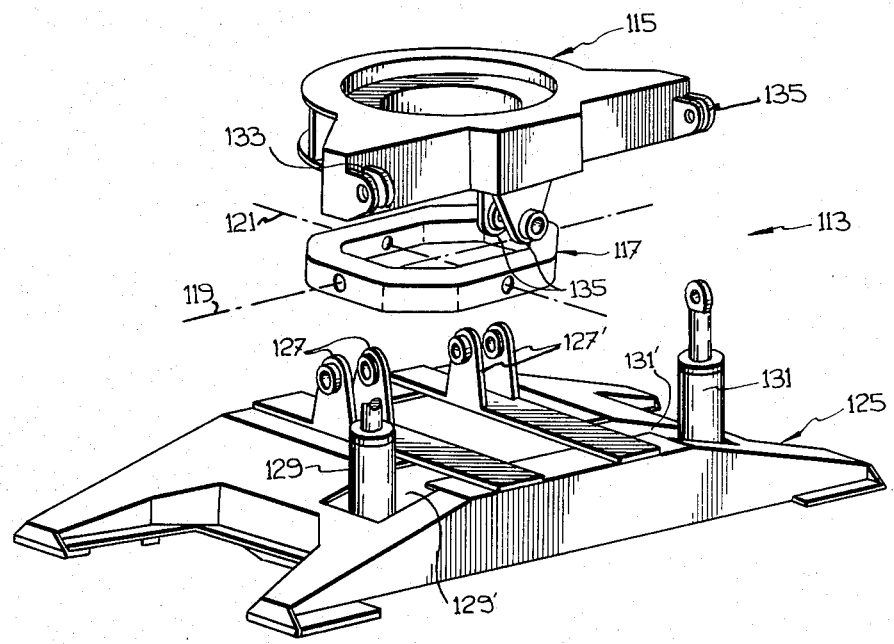
FIG. 7 is an exploded perspective view of another tilting mechanism according to the invention.

In the other embodiment shown in FIG. 7, the tilting mechanism 113 which makes the four-tilt of the machine possible, also comprises a crown 115 mounted, in any known manner, beneath the work base 5 for rotation of the work base relative to and about an axis which is normal to the crown 115.

Mounted beneath the crown 115 is a tilt member 117 in the form of a rigid ring provided with two sets of diagonally opposite holes capable of receiving pivots to define a pair of orthogonal axes 119 and 121 intersecting each other in the middle of the ring.

The crown 115 is pivotably connected onto the ring 117 for pivotal movement about the axis 121 by means of two sets of double ears extending downwardly from the crown (only set 135 is visible in FIG. 7).

Similarly, the crown 115 and the tilt member ring 117 are pivotably connected to a pedestal 125 which is fixedly secured to the central body 3. The pivotable connection of the tilt mechanism 117 to the pedestal 125 is made about the axis 119 by means of two other sets of double ears 127 and 127' extending upwardly from the pedestal 125.

By the aforementioned connection of the work base 5 to the pedestal 125 through the crown 115 and the tilt member ring 117, there is given to the base 5 a possibility of tilting in two planes normal to one another and upstanding from the pedestal 125.

Power means are of course provided to allow tilting of the ring 117 and the crown 115 connected to it to cause in turn similar tilting of the base and appertaining equipment. These power means comprise a pair of upwardly extending hydraulic jacks 129 and 131 having piston rods of which the free ends are pivotably connected to a pair of double ears 133 and 135 projecting from the crown 115, the other ends (not visible) of the hydraulic jacks being likewise mounted for pivotal movement on the pedestal 25 at the bottom of wells 129' and 131'.

As clearly shown in FIG. 7, the jacks 129 and 131 are symmetrically located to one another with respect to a vertical plane passing through the tilt axis 121 of the ring 117. The jacks 129 and 131 are also located on the same side of the vertical plane passing through the other tilt axis 119. It follows that actuation of jacks 129 and 131 in unison will lift or lower the work base by causing rotation of the crown 115 and ring 117 about the tilt axis 119, thereby providing a first two-way tilt. Actuation of one of jacks 129 and 131 only will however lift or lower the work base by causing rotation of the crown 115 and of the ring 117 connected to it above the other tilt axis 121, thereby providing the additional two-way tilt to obtain the required four-way tilt possibility.

In practice, the latter construction with the tilt axis 121 aligned with the longitudinal axis of the carrier, has allowed a 20° longitudinal slope adjustment for a 15° transversal slope adjustment without difficulties.

The embodiments of the invention in which an exclusive property or privilege is claimed are defined as follows:

1. In a self-propelled, four-way tilt, off-road vehicle for use over a natural terrain, said vehicle of the type having:
    a mobile carrier including a pair of laterally spaced ground-engaging traction means and a central body to which said traction means are connected for displacement of said carrier over the natural terrain,
    a work base mounted over the central body of said mobile carrier, and,
    a tilt mechanism joining the work base to the central body of said carrier for relative tilting movement between said work base and said central body about a pair of orthogonal axes to hold said work base level, said tilt mechanism having a crown mounted beneath said work base for rotation of said work base relative to and about an axis normal to said crown,
   the improvement wherein the tilt mechanism comprises:
    a pedestal fixedly secured to the central body of the carrier so as to be solid therewith;
    a rigid tilt member mounted between the pedestal and the crown;
    means for pivotably joining said tilt member to the pedestal secured to the central body of the carrier about a second pivot axis perpendicular to the first axis, said first and second pivot axes defining said pair of orthogonal axes of the tilt mechanism; and
    power means for tilting the work base relative to the central body of the carrier about both of said orthogonal axes of the tilt mechanism, said power means comprising at least two power jacks and means for pivotably mounting opposite ends of said at least two power jacks with respect to the central body and the pedestal of the carrier, and to the crown, respectively, said power jacks being extensible and retractable in directions intersecting the orthogonal axes of said tilt mechanism respectively, so as to tilt the crown and the work base as a unit about said orthogonal axes with respect to the central body of the carrier.

2. A vehicle as claimed in claim 1, wherein said tilt member is a cruciform part having longitudinal axes defining said first and second pivot axes of said tilt member.

3. A vehicle as claimed in claim 2, wherein said at least two power jacks are located at 90° to one another around the crown.

4. A vehicle as claimed in claim 3, wherein the carrier has longitudinal and transverse axes and the orthogonal axes of the tilt mechanism are aligned with said longitudinal and transverse axes of the carrier.

5. A vehicle as claimed in claim 3, wherein said central body and said tilt mechanism are so positioned with respect to each other that one of the tilt axes and the work base rotation axis lie in a common plane located generally centrally with respect to the central body.

6. A vehicle as claimed in claim 3, wherein each of the power jacks has one end pivotably mounted at the bottom of a well provided in the pedestal.

7. A vehicle as claimed in claim 2, wherein said means for pivotably joining the tilt member to the pedestal comprise a pair of ears integral to said pedestal and a pair of arms on the tilt member, the ears of the pedestal being pivotably mounted to ends of one of the arms of the tilt member, and said means for pivotably joining the tilt member to the crown having another pair of ears integral to said crown and to which are pivotably mounted ends of the other arm of the tilt member.

8. A vehicle as claimed in claim 1, wherein said tilt member is a ring provided with two sets of diametrically opposite holes having aligned axes defining said first and second axes of said tilt member.

9. A vehicle as claimed in claim 8, wherein said means for pivotably joining the tilt member to the pedestal comprise a first set of double ears integral to the pedestal and to which are pivotably mounted the tilt member by means of pivots passing through one set of diagonally opposite holes and said means for pivotably joining the tilt member to the crown comprise a second set of ears integral to said crown and to which are pivotably mounted the tilt member by means of pivots passing through the other set of diagonally opposite holes of said tilt member.

10. A vehicle as claimed in claim 9, comprising two power jacks and wherein said jacks are symmetrically located to one another with respect to a vertical plane passing through one of the axes of the tilt member and on the same side of a vertical plane passing through the other axis of said tilt member.

11. A vehicle as claimed in claim 10, wherein the carrier has longitudinal and transverse axes and the orthogonal axes of the tilt mechanism are aligned with said longitudinal and transverse axes of the carrier.

12. A vehicle as claimed in claim 10, wherein said central body and said tilt mechanism are so positioned with respect to each other that one of the tilt axes and the work base rotation axis lie in a common plane located generally centrally with respect to the central body.

* * * * *